United States Patent
Bains

(10) Patent No.: US 6,366,983 B1
(45) Date of Patent: Apr. 2, 2002

(54) METHOD AND SYSTEM FOR SYMMETRIC MEMORY POPULATION

(75) Inventor: Kuljit S. Bains, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/396,802

(22) Filed: Sep. 14, 1999

(51) Int. Cl.[7] .............................................. G06F 13/16
(52) U.S. Cl. ............................ 711/115; 711/5; 711/170
(58) Field of Search ............................. 711/5, 115, 170

(56) References Cited

U.S. PATENT DOCUMENTS 6,003,121 A * 12/1999 Wirt ........................... 711/170
6,108,745 A * 8/2000 Gupta et al. .................. 711/3

* cited by examiner

Primary Examiner—Reginald G. Bragdon
(74) Attorney, Agent, or Firm—Schwegman, Lundberg, Woessner & Kluth, P.A.

(57) ABSTRACT

A processing system and method allow for the population of a memory system while maintaining communication symmetry. The processing system has multiple communication channels which have the same propagation path lengths. The memory system can be expanded by adding additional memory device pairs. The system and method allow for the configuration of the computer memory in a symmetric manner with respect to either communication channels, or physical memory socket locations. In addition, a method uses a computer BIOS to determine locations of new memory devices and adjust the communication configuration. The configuration is defined by address channel identifiers, such as an identification bit.

16 Claims, 3 Drawing Sheets

METHOD AND SYSTEM FOR SYMMETRIC MEMORY POPULATION

TECHNICAL FIELD OF THE INVENTION

The present invention relates generally to processing systems and in particular the present invention relates to a method and a system to allow for symmetric memory population.

BACKGROUND OF THE INVENTION

Modem processing systems, such as personal computers include memory for storing data. Because the amount of memory needed by a user of the processing system is not know when the system is manufactured, the systems are often designed to allow the memory to be expanded. In a typical processing system, such as a personal computer (PC), the memory can be expanded by adding additional memory modules. For example, a processing system can be provided which has a memory card that includes a number of expansion sockets for accepting memory modules.

In some processing systems, the memory expansion sockets must be populated in pairs to obtain increased bandwidth. When populated in pairs, the memory needs to be populated in a manner which maintains symmetry between memory channels. The symmetry is defined by the memory communication channels, and not by the physical location of the expansion sockets. Because the memory communication channels and the physical location of the expansion sockets do not necessary correspond, a problem can be created when a user adds additional memory modules.

For the reasons stated above, and for other reasons stated below which will become apparent to those skilled in the art upon reading and understanding the present specification, there is a need in the art for a method and system which allow for symmetric memory population in a processing system.

SUMMARY OF THE INVENTION

In one embodiment, a processing system comprises a memory controller having a first memory communication channel and a second memory communication channel, and a memory card coupled to the memory controller. The memory card comprises a plurality of memory sockets for receiving memory devices, a first memory repeater circuit coupled to the first memory communication channel, and a second memory repeater circuit coupled to the second memory communication channel. The first and second memory repeater circuits each comprise first and second memory communication channel output connections. A processor is coupled to the memory controller to instruct the memory controller to modify an output address signal provided on the second memory communication channel. The output address signal identifies either the first or second memory communication channel output connections of the second memory repeater circuit.

In another embodiment, a processing system comprises a memory controller having a first memory communication channel output connection and a second memory communication channel output connection, and a memory card coupled to the memory controller. The memory card comprises a plurality of memory sockets for receiving memory devices, a first memory repeater circuit coupled to the first memory communication channel output connection, and a second memory repeater circuit coupled to the second memory communication channel output connection. The first and second memory repeater circuits each comprise first and second memory communication channel output connections. A signal propagation time from the memory controller first memory communication channel output connection to an input of the first memory repeater circuit is substantially equal to a signal propagation time from the memory controller second memory communication channel output connection to an input of the second memory repeater circuit. A processor is coupled to the memory controller to instruct the memory controller to invert a single bit output address signal provided on the second memory communication channel. The output address signal identifies a communication path with the memory sockets through either the first or second memory communication channel output connections of the second memory repeater circuit.

DETAILED DESCRIPTION OF THE INVENTION

Figure 1A:
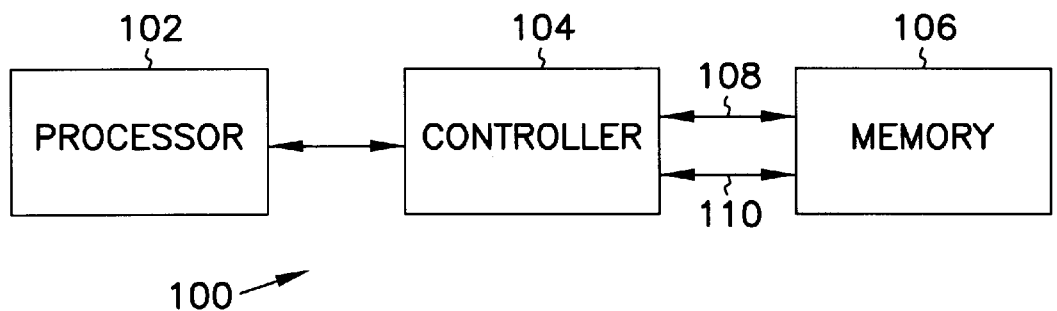
FIG. 1A is a block diagram of a processing system according to one embodiment of the present invention.

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

The present invention provides a method and system which assists in the addition of memory to a processing system, or computer system. In particular, maintaining a balanced memory in a processing system which uses multiple channels is facilitated by controlling addressing codes based upon either a configuration of memory or based upon the actual physical population pattern. Prior to focussing on embodiments of the invention, a brief description of processing systems and related terminology is provided.

A basic input/output system (BIOS) is built-in software, or code, that helps determine what resources a computer has available, and the proper control of the resources, without accessing programs from a data storage disk. For example, on a PC, the BIOS can contain all the code required to control the keyboard, display screen, disk drives, serial communications, and a number of miscellaneous functions. The BIOS is typically placed in a read only memory (ROM), often called a ROM BIOS. This ensures that the BIOS will always be available and will not be damaged by storage disk failures. It also makes it possible for a computer to boot itself. The boot process loads the first piece of software that starts a computer. Because the computer operating system is essential for running all other programs, it is usually the first piece of software loaded during the boot process.

Because random access memory (RAM) is faster than ROM, many computer manufacturers design systems so that the BIOS is copied from ROM to RAM each time the computer is booted. This process is known as shadowing. In addition, some computers have a flash BIOS, which means that the BIOS has been recorded on a flash memory chip, which can be updated if necessary.

Printed circuit boards, sometimes abbreviated PCB, can be described generally as a thin plate on which circuit chips and other electronic components are placed. Computers usually consist of one or more printed circuit boards, often called cards or adapters. Circuit boards used in a computer processing system can include a mother board, expansion board, daughtercard, controller board and/or a network interface card. The mother board is a principal board that has connectors for attaching devices to a processing bus. Typically, the mother board contains the central processing unit (CPU), memory, and basic controllers for the system. The motherboard can also be called the system board or main board. An expansion board is generally any board that plugs into one of a computer's expansion slots. Expansion boards can include controller boards, local area network (LAN) cards, and video adapters.

A daughtercard is a printed circuit board that plugs into another circuit board (usually the motherboard). A daughtercard is similar to an expansion board, but it typically accesses the motherboard components, memory and CPU, directly instead of sending data through an expansion bus.

A controller board is a special type of expansion board that contains a controller for a peripheral device. A controller board is often needed when a new device, such as a disk drive or graphics monitor, is attached to a computer. Finally, a network interface card (NIC) is an expansion board that enables a computer to be connected to a local-area network (LAN), or the like.

Figure 1B:
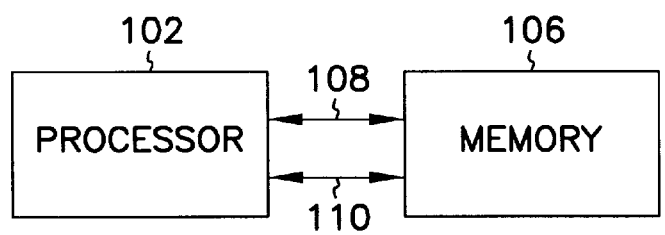
FIG. 1B is a block diagram of a processing system according to another embodiment of the present invention.

The present invention is directed to processing systems or computers which include a memory system having multiple communication channels. FIG. 1A illustrates a processing system 100 incorporating the present invention. The system includes a processor 102, a memory controller 104 and a memory system 106. The controller is coupled to the memory system via at least two communication channels 108 and 110. The processor and controller can be a single unit in one embodiment of the present invention (FIG. 1B). The memory system can be configured with a plurality of slots which can receive memory modules, such as a single in-line memory module (SIMM), a rambus in-line memory module (RIMM), or a dual in-line memory module (DIMM). Further, the memory modules can include any type of memory, including but not limited to dynamic random access memory (DRAM), rambus dynamic random access memory (RDRAM), or synchronous dynamic random access memory (SDRAM). The memory system is configured to operate using either communication channel. Thus, communication propagation paths from the controller to the memory devices must be identical for each channel. Further, the load on each channel must be equal, therefore the number of memory devices coupled to each communication channel must be equal.

When a user of the processing system adds memory devices to memory system 106, symmetry needs to be maintained between the channels. That is, both the number of memory devices and the physical location of the memory devices must be taken into consideration. Often physical design constraints are imposed upon the memory system. One constraint is to minimize conductor routing. In addition, it may be desired to maintain equal propagation paths without the use of delay circuits to normalize a communication path. These constraints can prohibit the memory system from having a symmetric physical appearance. That is, corresponding expansion slots for each communication channel may not be physically located in a symmetric manner. This can create a problem with installing additional memory devices. That is, it is natural for humans to install additional memory devices in a manner which 'looks' symmetrical. This phenomena is explained in more detail with reference to FIG. 2.

Figure 2:
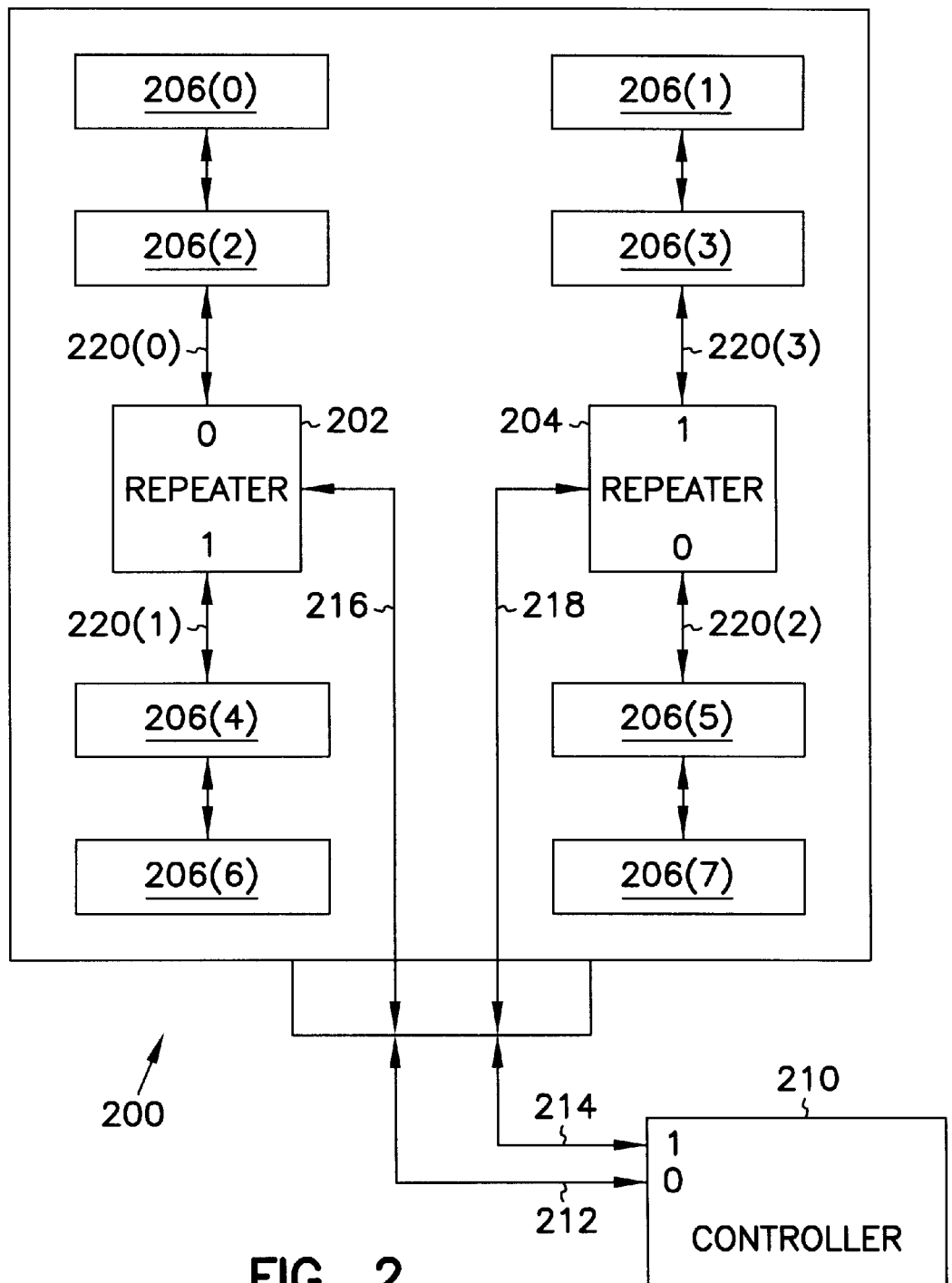
FIG. 2 is a detailed illustration of a memory card and controller according to one embodiment of the present invention.

FIG. 2 illustrates one embodiment of a memory card 200 coupled to a memory controller 210. The card includes two memory repeater circuits 202 and 204. In one embodiment, these repeaters are identical. The memory card includes eight memory sockets 206(0)–206(7) which are configured to accept a memory device, such as a memory module. The repeaters are each coupled to communicate with four of the memory sockets. The repeaters operate as communication hubs to direct data communications to the memory locations. As such, the details of the repeater circuits are not described herein. Any hub type circuit can be used which directs communication in response to an address. The term memory card as used herein is not limited to any specific type of card, but can be any circuit board including a computer mother board.

The memory card is coupled to memory controller 210 via primary communication channel zero 212 and channel one 214. The communication channels are coupled to the repeater circuits via communication line conductors 216 and 218. It will be appreciated that the propagation paths of these conductors are equal to maintain an electrically balanced system. Each repeater circuit has secondary communication channels which are used to communicate with the memory devices. Repeater circuit 202 incudes a connection 220(0) which is the secondary communication channel zero and a connection 220(1) which is the secondary communication channel one. The orientation of secondary channels zero and one are noted as being upward and downward, respectively, in FIG. 2.

Repeater circuit 204 incudes a connection 220(2) which is the secondary communication channel zero and a connection 220(3) which is the secondary communication channel one. The orientation of the secondary channels zero and one are noted as being downward and upward, respectively, in FIG. 2. Thus, the orientation of the two repeater circuits are inversed with respect to each other.

Because primary channels 212 and 214 need to remain balanced, two memory devices must be added at a time. Further, the memory devices must be inserted in corresponding memory sockets. For example, sockets 206(0) and 206(7) are one pair. Likewise, sockets 206(1) and 206(6), sockets 206(2) and 206(5), and sockets 206(3) and 206(4) each form pairs of sockets. It will be appreciated that a user who wishes to add memory devices may not follow this pattern. Instead, memory devices may be placed in a physical pattern which looks symmetric. That is, additional memory devices would probably be placed in sockets 206(2) and 206(3) as a pair. This configuration, however, adds a memory to secondary channel zero of repeater 202 and adds a memory to secondary channel one of repeater 204. This configuration would result in an asymmetric memory system. The present invention addresses this problem as explained below.

Memory controller 210 communicates with the memory card by providing an indication which secondary channel to use. That is, the memory controller provides an indication of the communication path. For example, the memory controller can initiate a communication over primary channel one with repeater circuit 204. The communication includes an identifier that informs repeater 204 that the communication is intended for its secondary channel one. This identifier can be any type of signal, but in one embodiment the identifier is a single bit appended to the communication packets. As such, the bit is a zero to identify secondary channel zero and the bit is a one to identify secondary channel one. By manipulating this identifier, the memory card configuration can be changed. That is, the memory card can be configured to allow physically symmetric memory sockets to also be symmetric with respect to the memory controller communication channels.

Figure 3:
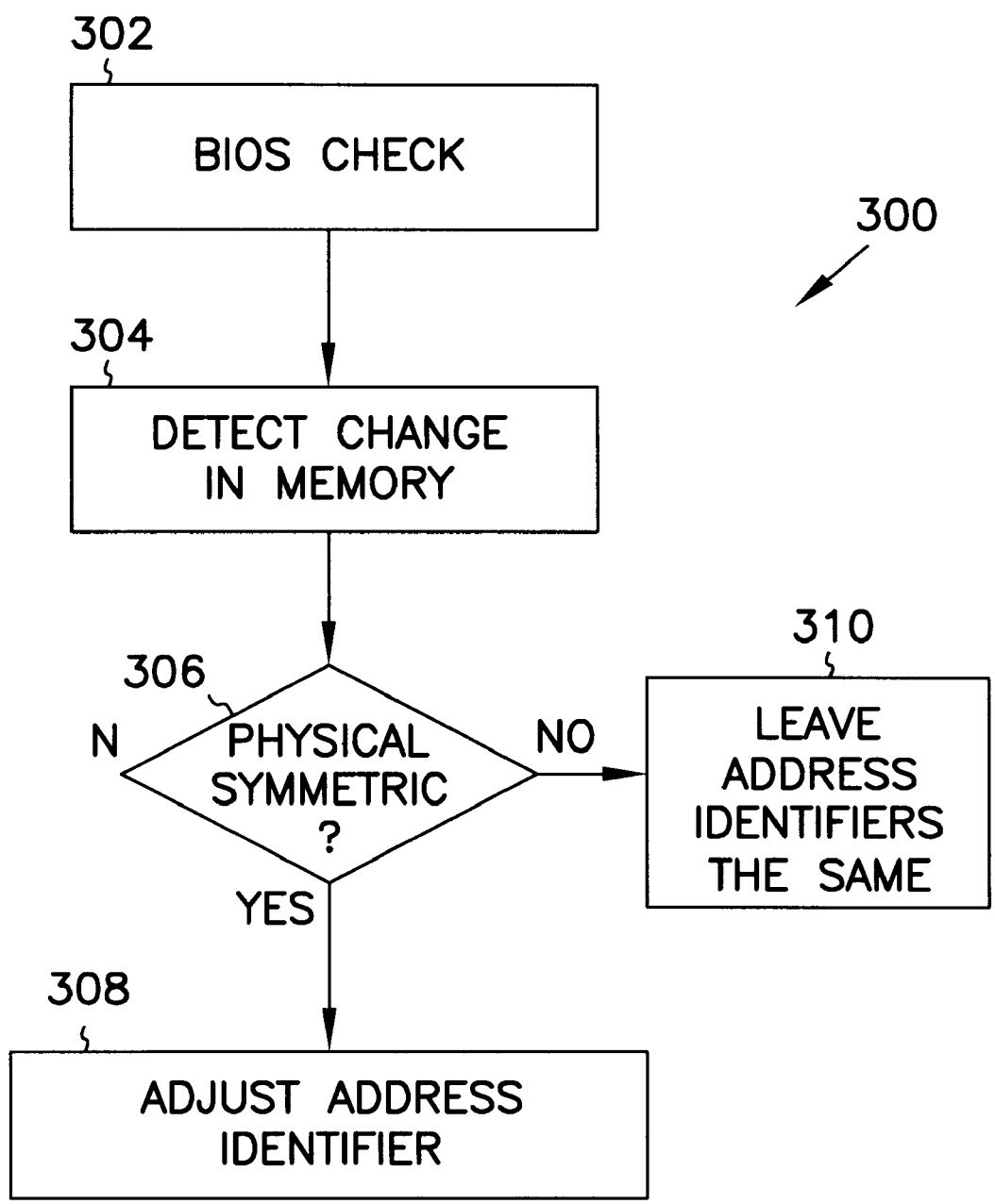
FIG. 3 is a flow chart of a method according to one embodiment of the present invention.

In operation, the processing system can be configured when it is manufactured to default to symmetric channels. In this configuration, it is intended that the memory card be populated based upon the secondary channels. In an alternate embodiment, the identifying bit for one primary channel is inverted. As such, the default identifier is a one for a first primary channel, and a zero for a second primary channel. This configuration allows the memory card to be expanded by inserting memory devices in a physically symmetric manner. In yet another embodiment 300 illustrated in FIG. 3, the computer BIOS performs a check of the memory card to determine if any new memory devices have been added, at 302. The BIOS also determines the sockets where the new memory devices have been added, at 304. If the memory devices have been added in a physically symmetric manner (step 306), the address identify is adjusted at 308 for one of the primary channels. If the memory devices have been added to the sockets in a manner which maintains symmetry based upon the secondary channel locations, the BIOS keeps, or adjusts, the bit identifier such that both primary channels are the same, at 310.

It will be appreciated by those skilled in the art with the benefit of the present description that the present invention is applicable to any computer system having parallel memory channels. The number of primary and secondary channels is not critical and should not be limited to two.

CONCLUSION

A processing system and method have been described which allows for the population of a memory system while maintaining communication symmetry. The processing system has multiple communication channels which have the same propagation path lengths. The memory system can be expanded by adding additional memory device pairs. The system and method allow for the configuration of the computer memory in a symmetric manner with respect to either communication channels, or physical memory socket locations. In addition, a method has been described which uses a computer BIOS to determine locations of new memory devices and adjust the communication configuration. The configuration is defined by address channel identifiers, such as an identification bit. The address identifier is inversed respectively between parallel communication channels.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof

What is claimed is:

1. A processing system comprising:
    a processor coupled to a first memory communication channel and a second memory communication channel;
    a board comprising a plurality of memory sockets for receiving memory devices, a first memory repeater circuit coupled to the first memory communication channel, and a second memory repeater circuit coupled to the second memory communication channel, the first and second memory repeater circuits each comprise first and second memory communication channel output connections; and
    the processor modifies an output address signal provided on the second memory communication channel, the output address signal identifying either the first or second memory communication channel output connections of the second memory repeater circuit.

2. The processing system of claim 1 wherein the output address signal is a single bit signal.

3. The processing system of claim 1 wherein the board comprises eight memory sockets, and is arranged such that two memory sockets are coupled to each of the first and second memory communication channel output connections of the first memory repeater circuit and the second memory repeater circuit.

4. The processing system of claim 1 wherein the processor determines which memory sockets are populated with a memory device prior to modifying the output address signal.

5. The processing system of claim 1, wherein a signal propagation time from the processor to an input of the first memory repeater circuit is substantially equal to a signal propagation time from the processor to an input of the second memory repeater circuit.

6. A processing system comprising:
    a memory controller having a first memory communication channel output connection and a second memory communication channel output connection;
    a circuit board coupled to the memory controller, the circuit board comprising a plurality of memory sockets for receiving memory devices, a first memory repeater circuit coupled to the first memory communication channel output connection, and a second memory repeater circuit coupled to the second memory communication channel output connection, the first and second memory repeater circuits each comprise first and second secondary memory communication channel output connections, a signal propagation time from the memory controller first memory communication channel output connection to an input of the first memory repeater circuit is substantially equal to a signal propagation time from the memory controller second memory communication channel output connection to an input of the second memory repeater circuit; and
    a processor coupled to the memory controller to instruct the memory controller to invert a single bit output address signal provided on the second memory communication channel, the output address signal identifying a communication path with the memory sockets through either the first or second secondary memory communication channel output connections of the second memory repeater circuit.

7. The processing system of claim 6 wherein the circuit board comprises eight memory sockets, and is arranged such that two memory sockets are coupled to each of the first and second secondary memory communication channel output connections of the first memory repeater circuit and the second memory repeater circuit.

8. The processing system of claim 6 wherein the processor determines which memory sockets are populated with a memory device prior to instructing the memory controller to modify the output address signal.

9. A processing system comprising:
- a memory controller having a first primary memory communication channel output connection and a second primary memory communication channel output connection;
- a memory card coupled to the memory controller, the memory card comprising a plurality of memory sockets for receiving memory devices, a first memory repeater circuit coupled to the first primary memory communication channel output connection, and a second memory repeater circuit coupled to the second primary memory communication channel output connection, the first and second memory repeater circuits each comprise first and second secondary memory communication channel output connections and are arranged such that the first secondary memory communication channel output connection of the first memory repeater circuit is located on a top edge of the first memory repeater circuit in a plan view, and the first secondary memory communication channel output connection of the second memory repeater circuit is located on a bottom edge of the second memory repeater circuit in the plan view;
- a signal propagation time from the memory controller first primary memory communication channel output connection to an input of the first memory repeater circuit is substantially equal to a signal propagation time from the memory controller second primary memory communication channel output connection to an input of the second memory repeater circuit; and
- a processor coupled to the memory controller to instruct the memory controller to invert a single bit output address signal provided on the second memory communication channel, the output address signal identifying a communication path with the memory sockets through either the first or second secondary memory communication channel output connections of the second memory repeater circuit, the processor determines which memory sockets are populated with a memory device prior to instructing the memory controller to modify the output address signal.

10. A method of configuring a processing system comprising a memory controller, first and second memory repeater circuits, and a plurality of memory sockets coupled to the first and second memory repeater circuits, the method comprising:
- determining which ones of the plurality of memory sockets are populated with a memory device;
- determining if the memory sockets have been populated in a symmetric manner with respect to communication from the memory controller; and
- modifying a communication path instruction provided by the memory controller to the second memory repeater circuit.

11. The method of claim 10 wherein determining which ones of the plurality of memory sockets are populated is performed by a basic input/output system (BIOS) of a processor coupled to the memory controller.

12. The method of claim 10 wherein the first and second memory repeater circuits have first and second memory communication channel output connections, and the communication path instruction provided by the memory controller identifies either the first or second memory communication channel output connection.

13. The method of claim 10 wherein the communication path instruction is a single bit signal.

14. A method of configuring a processing system comprising a processor, first and second memory repeater circuits, and a plurality of memory sockets coupled to the first and second memory repeater circuits, the method comprising:
- determining which ones of the plurality of memory sockets are populated with a memory device;
- determining if the memory sockets have been populated in a predetermined manner with respect to communication from the memory controller; and
- modifying a communication path instruction provided by the memory controller to the second memory repeater circuit.

15. A processing system comprising:
- a memory controller having a first primary memory communication channel and a second primary memory communication channel; and
- a memory card coupled to the memory controller, the memory card comprising a plurality of memory sockets for receiving memory devices, a first memory repeater circuit coupled to the first primary memory communication channel, and a second memory repeater circuit coupled to the second primary memory communication channel, the first and second memory repeater circuits each comprise first and second secondary memory communication channel output connections,
- the memory controller provides a first communication path identifier bit on the first primary memory communication channel to identify a communication destination of the first secondary memory communication channel output connection of the first memory repeater circuit, and the memory controller provides a second communication path identifier bit on the second primary memory communication channel to identify a communication destination of the first secondary memory communication channel output connection of the second memory repeater circuit, the first and second communication path identifier bits have opposite default states.

16. The processing system of claim 15 further comprising a processor coupled to the memory controller, the processor provides instructions to the memory controller to set the first and second communication path identifier bits.

* * * * *